United States Patent
Porte et al.

(10) Patent No.: US 8,876,054 B2
(45) Date of Patent: Nov. 4, 2014

(54) DE-ICING DEVICE COMPRISING MEANS FOR DETECTION OF A LEAKAGE IN A HOT AIR SUPPLY SYSTEM

(75) Inventors: Alain Porte, Colomiers (FR); Jerome Dewitte, Toulouse (FR); Emmanuel Cayrol, Pibrac (FR)

(73) Assignee: Airbus Operations SAS, Toulouse (FR)

( * ) Notice: Subject to any disclaimer, the term of this patent is extended or adjusted under 35 U.S.C. 154(b) by 269 days.

(21) Appl. No.: 13/047,988

(22) Filed: Mar. 15, 2011

(65) Prior Publication Data

US 2011/0226903 A1 Sep. 22, 2011

(30) Foreign Application Priority Data

Mar. 18, 2010 (FR) ...................................... 10 51943

(51) Int. Cl.
*B64D 15/04* (2006.01)
*B64D 33/02* (2006.01)
(52) U.S. Cl.
CPC ........ *B64D 15/04* (2013.01); *B64D 2033/0286* (2013.01); *B64D 33/02* (2013.01); *B64D 2033/0233* (2013.01)
USPC .................................................... 244/134 B
(58) Field of Classification Search
USPC ....... 244/134 A, 134 B, 134 C, 134 F, 134 R; 37/196, 227; 137/487.5, 488, 490, 491
See application file for complete search history.

(56) References Cited

U.S. PATENT DOCUMENTS

| | | | | |
|---|---|---|---|---|
| 3,749,336 A * | 7/1973 | Christensen et al. | ...... | 244/134 B |
| 3,996,787 A * | 12/1976 | Edgington | ................. | 244/134 F |
| 4,757,963 A * | 7/1988 | Cole | ......................... | 244/134 B |
| RE36,215 E * | 6/1999 | Rosenthal | ................ | 244/134 B |
| 6,079,670 A * | 6/2000 | Porte | ......................... | 244/134 B |
| 6,193,192 B1 * | 2/2001 | Porte | ......................... | 244/134 B |
| 6,371,411 B1 * | 4/2002 | Breer et al. | ................ | 244/134 R |
| 6,443,395 B1 | 9/2002 | Porte et al. | | |
| 6,688,558 B2 * | 2/2004 | Breer et al. | ................ | 244/134 R |
| 2002/0027180 A1 | 3/2002 | Porte et al. | | |
| 2010/0200699 A1 | 8/2010 | Porte | | |

FOREIGN PATENT DOCUMENTS

| | | |
|---|---|---|
| EP | 1103462 A1 | 5/2001 |
| EP | 1186533 A1 | 3/2002 |
| FR | 2813581 A1 | 3/2002 |
| FR | 2887294 A1 | 12/2006 |

OTHER PUBLICATIONS

French Search Report, dated Nov. 10, 2010, from corresponding French application.

* cited by examiner

*Primary Examiner* — Joseph W Sanderson
*Assistant Examiner* — Marc Burgess
(74) *Attorney, Agent, or Firm* — Young & Thompson

(57) ABSTRACT

A device for defrosting a leading edge of an aircraft, includes at least one opening (52) for ejecting hot air, a pipe (56) for directing the hot air from a power plant to the ejection opening (52), and elements (58) for measuring the pressure inside the pipe (56), characterized in that the pipe (56) includes at least one cross-section reduction called a chokepoint (62) upstream from the elements (58) for measuring pressure.

21 Claims, 2 Drawing Sheets

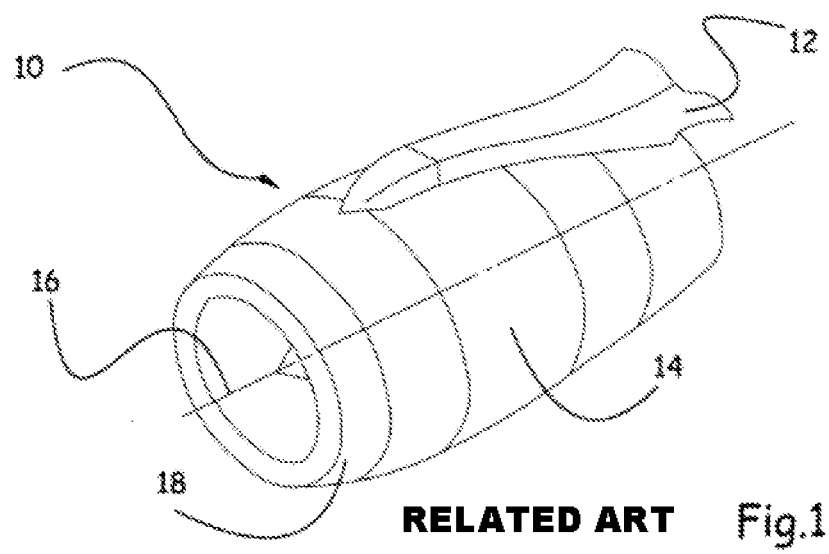
RELATED ART Fig.1
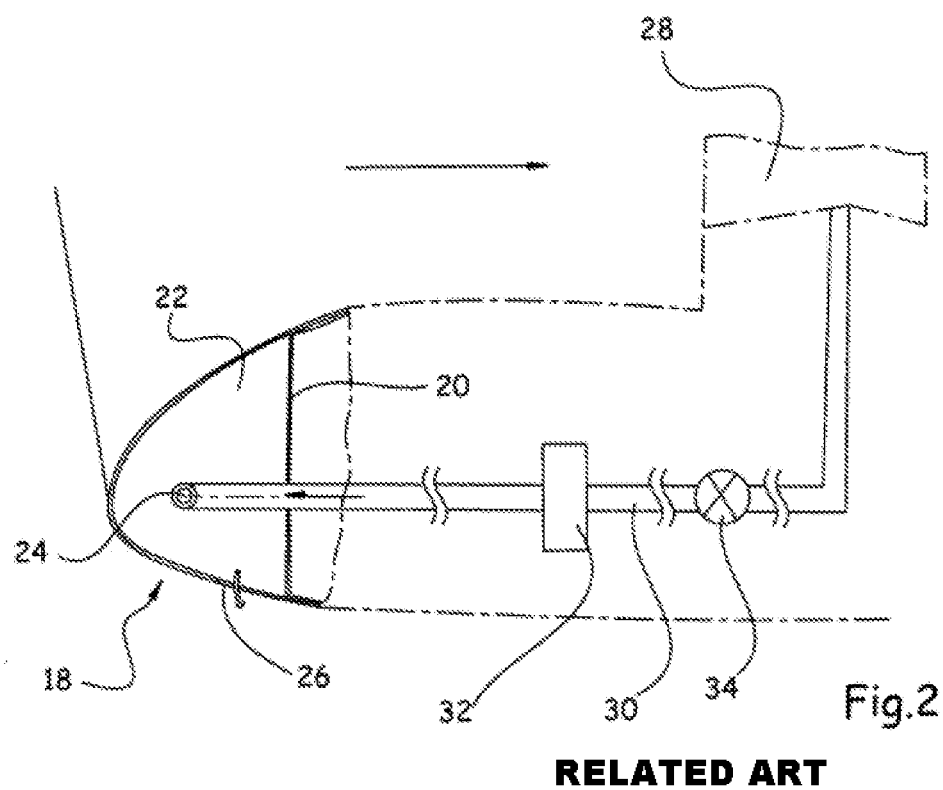
RELATED ART Fig.2

DE-ICING DEVICE COMPRISING MEANS FOR DETECTION OF A LEAKAGE IN A HOT AIR SUPPLY SYSTEM

BACKGROUND OF THE INVENTION

FIELD OF THE INVENTION

This invention relates to a defrosting device that comprises means for detecting a leak at a hot air supply.

DESCRIPTION OF THE RELATED ART

In a known manner, as illustrated in FIG. 1, a propulsion system 10 of an aircraft, for example connected under the wing by means of a mast 12, comprises a nacelle 14 in which a power plant is arranged in an essentially concentric manner. The longitudinal axis of the nacelle is referenced 16. The nacelle 14 comprises an inside wall that delimits a pipe with an air intake 18 at the front that makes it possible to channel the air in the direction of the power plant.

This invention relates more particularly to the nacelles that integrate a process for protection against frost or ice using hot air in contact with the inside wall of the air intake 18, in particular hot air sampled at the engine.

According to a known embodiment according to the documents FR-2,813,581 and U.S. Pat. No. 6,443,395, illustrated in FIG. 2, a nacelle 14 comprises—on the inside—a partition called a front frame 20 that delimits with the air intake 18 an annular pipe 22 that extends over the entire circumference of the nacelle and that has an essentially D-shaped cross-section.

This pipe 22 comprises a hot air supply with at least one opening 24, with the air circulating in this pipe being evacuated via an exhaust 26.

The hot air is sampled at the power plant 28, and the hot air supply comprises a pipe 30 for directing it to the opening 24. This pipe 30 comprises means 32 for measuring the pressure as well as means 34 for regulating the pressure so as to deliver the required quantity of hot air at the opening 24.

The opening 24 has a chokepoint so as to obtain a sonic impact, namely a high pressure upstream from the opening 24 and a low pressure downstream, on the flow plane of the fluids.

In some zones, for example at the power plant, means can be provided to detect the complete or almost complete break of the pipe 30, such as, for example, at least one temperature sensor.

However, taking into account the environment and in particular because of the ventilation of the engine zone, a temperature sensor can detect only significant leaks, such as, for example, during the complete or almost complete break of the pipe 30, able to produce major temperature variations, and cannot detect the small leaks causing only a slight temperature elevation.

For certain zones such as the pipe 22, a temperature sensor cannot make it possible to detect a leak or the complete or almost complete break of the pipe 30, with these zones being subjected to temperatures that are always high whether or not they are in the presence of a leak or a complete or almost complete break of the pipe 30.

Consequently, there is no means for detecting a limited but yet adequate leak for making the defrosting capacity inadequate.

SUMMARY OF THE INVENTION

Also, the purpose of this invention is to remedy this problem by proposing a defrosting device that makes it possible to detect a leak at the hot air supply and therefore to monitor its proper operation.

For this purpose, the invention has as its object a device for defrosting a leading edge of an aircraft, whereby said device comprises at least one opening for ejecting hot air, a pipe for directing the hot air from a power plant to said ejection opening, and means for measuring the pressure inside said pipe, characterized in that said pipe comprises at least one cross-section reduction called a chokepoint upstream from the means for measuring pressure.

BRIEF DESCRIPTION OF THE DRAWING FIGURES

Other characteristics and advantages will emerge from the following description of the invention, a description that is provided only by way of example, relative to the accompanying drawings in which:

FIG. 1 is a perspective view of an aircraft nacelle,

FIG. 2 is a cutaway along a longitudinal plane of a portion of a nacelle according to the prior art.

DETAILED DESCRIPTION OF THE INVENTION

Figure 3:
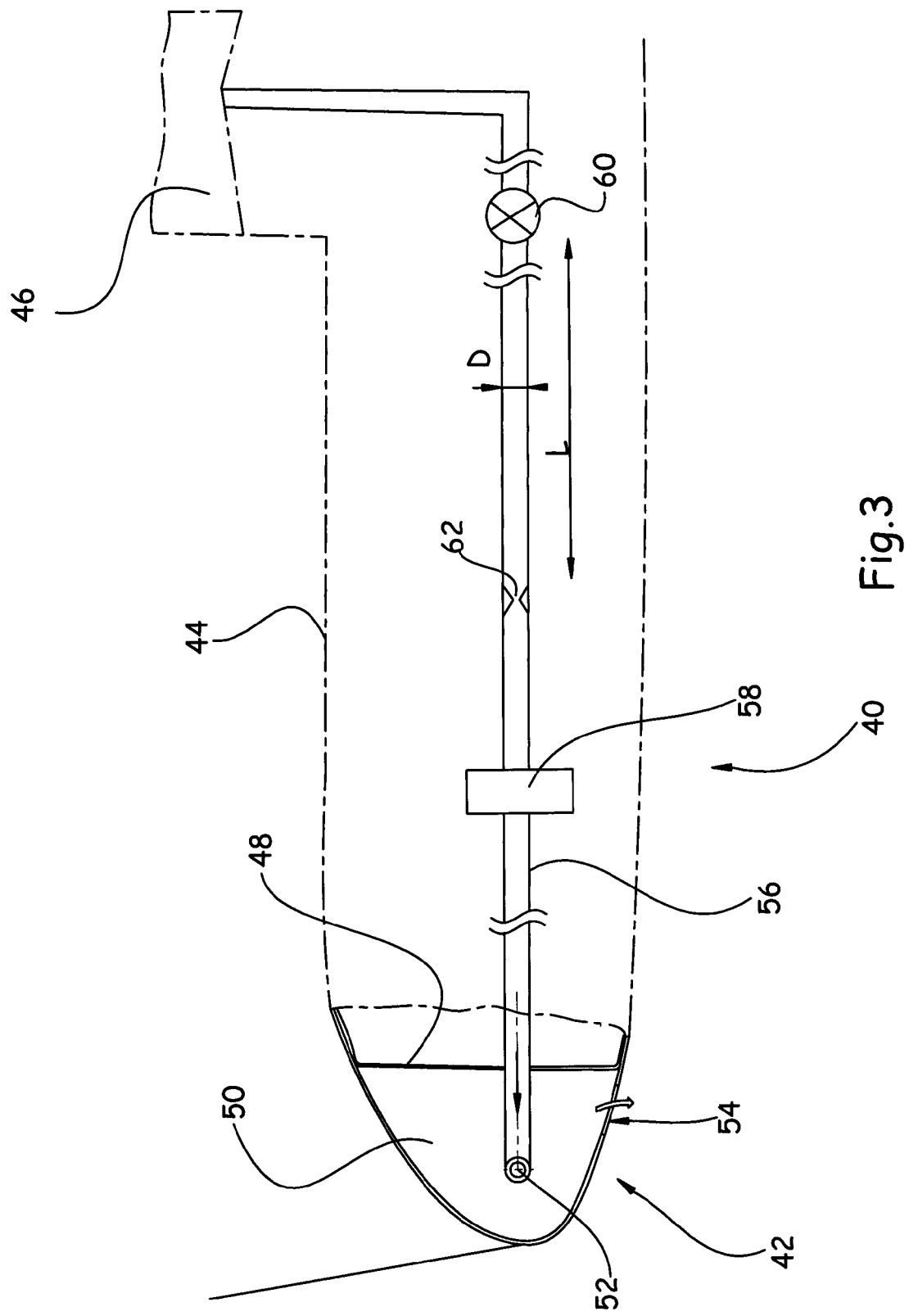
FIG. 3 is a cutaway along a longitudinal plane of a portion of a nacelle according to the invention.

At 40, FIG. 3 shows a portion of an aircraft nacelle that comprises an air intake 42 at the front that is extended inside by a pipe 44 that makes it possible to channel the air in the direction of a power plant 46 that is shown diagrammatically. This nacelle 40 comprises a system for preventing or limiting the accumulation of frost or ice at the outside surface of the air intake 42 that uses hot air in contact with the inside surface of said air intake, in particular hot air that is sampled at the power plant 46. For this purpose, on the inside, the nacelle 42 comprises a partition that is called a front frame 48 that with the air intake 42 delimits an annular pipe 50 that extends over the entire circumference of the nacelle and that has an essentially D-shaped cross-section.

This annular pipe 50 comprises a hot air supply that comprises at least one opening 52 that makes it possible to inject hot air on contact with the inside surface of the wall to be treated. The nacelle also comprises means 54 for discharging hot air outside of the annular pipe 50. Although described as applied to an air intake, the invention can be applied to all of the frost or ice treatment systems at a leading edge of an aircraft that uses hot air.

Hot air is sampled at the power plant 46, and the hot air supply comprises a pipe 56 for directing it to the opening 52. In a known manner, this pipe 56 comprises means 58 for measuring the pressure as well as—upstream—means 60 for regulating the pressure so as to deliver the required quantity of hot air at the opening.

The means 58 for measuring the pressure and the means 60 for regulating the pressure are part of the power plant 46 and are provided by the mechanic.

Thus, the means 60 for regulating the pressure are controlled by the on-board computer of the aircraft based on commands transmitted to the computer by the pilot and/or signals or information transmitted to the computer by the pressure measuring means 58.

The opening(s) 52 has/have a total ejection cross-section S that corresponds to the sum of the cross-sections of the openings 52.

Preferably, the openings 52 are each arranged at the end of a pipe whose shapes and dimensions are determined in such a way as to obtain a sonic impact at the opening(s).

According to the invention, the pipe 56 comprises at least one cross-section reduction called a chokepoint 62 upstream from the means 58 for measuring the pressure. The sonic impact thereby appears at the chokepoint 62 and no longer at the opening(s) 52 although the pressure is high upstream from the chokepoint and low downstream.

This chokepoint 62 makes it possible to detect a leak by the means 58 for measuring the pressure downstream from said means. Actually, the appearance of a leak will produce a pressure variation that is more significant and therefore detectable by the measuring means 58 relative to a normal operating pressure that is low because of the presence of the chokepoint 62.

This arrangement makes it possible to use existing measuring means 58 and to not add other measuring means for detecting a leak. In addition, the measuring means 58 can transmit to a computer leak information that may or may not be specific and that can transmit a warning indicating altered operation of the defrosting system.

In addition, this chokepoint 62 is well-built and requires only very limited maintenance over time.

Preferably, the cross-section of the chokepoint S' is larger than the ejection cross-section S.

Advantageously, the cross-section of the chokepoint S' is equal to the ejection cross-section S to which is added a cross-section that corresponds to the pressure drops that are present in the pipe 56 between the chokepoint 62 and the opening(s) 52 and a margin. This chokepoint 62 has shapes that are suitable for limiting the disruptions and the pressure drops. According to one embodiment, the chokepoint 62 has a convergent shape and then a divergent shape.

According to another characteristic of the invention, the chokepoint 62 is arranged between the regulating means 60 and the measuring means 58.

Preferably, the chokepoint 62 is arranged at a distance L that is greater than or equal to 5×D relative to the regulating means 60, whereby D is the diameter of the pipe 56 such that the chokepoint 62 does not disrupt the regulating means 60.

Advantageously, the chokepoint 62 is arranged as close as possible to the measuring means 58 so that the value of the pressure drops between the chokepoint 62 and the opening(s) 52 is as small as possible so as to enhance the sensitivity of the device for detecting a leak.

The invention claimed is:

1. A device for defrosting a leading edge of an aircraft, comprising:
    at least one ejection opening (52) for ejecting hot air;
    a pipe (56) for directing the hot air from a power plant to said ejection opening (52);
    a pressure measuring device (58) inside said pipe (56);
    at least one cross-section reduction of said pipe (56) called a chokepoint (62) upstream from the pressure measuring device (58), a normal pressure being high upstream from said chokepoint (62) and low downstream; and
    a leak detector comprising said chokepoint (62) and said pressure measuring device (58), which allows leak detection by an enhanced pressure variation relative to the low normal pressure downstream from said chokepoint, the enhanced pressure variation being detected by the pressure measuring device (58), a specific position of the chokepoint relative to the pressure measuring device being configured so that the pressure variation produced by a leak is significant and detectable by the pressure measuring device relative to the normal operating pressure,
    wherein the chokepoint (62) has a cross-section (S') that is larger than a total cross-section (S) of the at least one ejection opening (52),
    the cross-section (S') of the chokepoint (62) is equal to the ejection cross-section (S) that is increased by a cross-section that corresponds to a margin and to pressure drops that are present in the pipe (56) between said chokepoint (62) and the at least one opening (52), and
    a sonic impact appears at the chokepoint (62) so that the leak detector detects the enhanced pressure variation relative to the low normal pressure downstream from said chokepoint (62), and the sonic impact is dissipated by the time the sonic impact reaches the at least one ejection opening (52) such that there is no sonic impact at the least one ejection opening (52).

2. The defrosting device according to claim 1, wherein said chokepoint (62) has suitable shapes for limiting disruptions and pressure drops.

3. The defrosting device according to claim 2, wherein said chokepoint (62) has a convergent shape and then a divergent shape.

4. The defrosting device according to claim 1, wherein said chokepoint (62) is arranged between the pressure measuring device (58) and a regulator (60).

5. The defrosting device according to claim 4, wherein said chokepoint (62) is arranged at a distance (L) that is greater than or equal to 5×D relative to the regulator (60), whereby D is the diameter of the pipe (56).

6. The defrosting device according to claim 5, wherein said chokepoint (62) is arranged as close as possible to the pressure measuring device (58).

7. The defrosting device according to claim 4, wherein said chokepoint (62) is arranged as close as possible to pressure measuring device (58).

8. The defrosting device according to claim 4, wherein said chokepoint (62) has suitable shapes for limiting disruptions and pressure drops.

9. An aircraft nacelle that comprises the defrosting device according to claim 1.

10. The defrosting device according to claim 1, wherein said chokepoint (62) is arranged between the pressure measuring device (58) and the regulator (60).

11. The defrosting device according to claim 1, wherein a sonic impact appears at the at least one chokepoint.

12. A device for defrosting a leading edge of an aircraft and detecting leaks, comprising:
    at least one opening adapted for ejecting hot air;
    a pipe adapted for directing the hot air from a power plant to said ejection opening;
    a pressure measuring device inside said pipe;
    at least one chokepoint upstream from the pressure measuring device, a normal pressure being high upstream from said chokepoint and low downstream, the at least one chokepoint being configured so that a sonic impact appears at the at least one chokepoint; and
    a leak detector comprising said chokepoint and said pressure measuring device, which allows leak detection by an enhanced pressure variation relative to the low normal pressure downstream from said chokepoint, the enhanced pressure variation being detected by the pressure measuring device, a specific position of the chokepoint relative to the pressure measuring device being configured so that the pressure variation produced by a leak is significant and detectable by the pressure measuring device relative to the normal operating pressure,
    wherein a sonic impact appears at the chokepoint so that the leak detector detects the enhanced pressure variation relative to the low normal pressure downstream from said chokepoint, and the sonic impact is dissipated by the time the sonic impact reaches the at least one ejection opening such that there is no sonic impact at the least one ejection opening.

13. The defrosting device according to claim 12, wherein the chokepoint has a cross-section S' that is larger than a total cross-section S of the at least one ejection opening.

14. The defrosting device according to claim 13, wherein the cross-section S' of the chokepoint is equal to the total ejection cross-section S that is increased by a cross-section that corresponds to a margin and to pressure drops that are present in the pipe between said chokepoint and the at least one ejection opening.

15. The defrosting device according to claim 12, wherein said chokepoint has suitable shapes for limiting disruptions and pressure drops.

16. The defrosting device according to claim 15, wherein said chokepoint has a convergent shape and then a divergent shape.

17. The defrosting device according to claim 12, wherein said chokepoint is arranged between the pressure measuring device and a regulator.

18. The defrosting device according to claim 17, wherein said chokepoint is arranged at a distance L that is greater than or equal to 5×D relative to the regulator, whereby D is a diameter of the pipe.

19. A device for defrosting a leading edge of an aircraft, comprising:
   at least one ejection opening for ejecting hot air;
   a pipe for directing the hot air from a power plant to said ejection opening;
   a pressure measuring device inside said pipe;
   at least one cross-section reduction of said pipe called a chokepoint upstream from the pressure measuring device, a normal pressure being high upstream from said chokepoint and low downstream, a cross-section of the chokepoint being equal to an ejection cross-section of the at least one ejection opening that is increased by a cross-section that corresponds to a margin and to pressure drops that are present in the pipe between said chokepoint and the at least one election opening; and
   a leak detector comprising said chokepoint and said pressure measuring device, which allows leak detection by an enhanced pressure variation relative to the low normal pressure downstream from said chokepoint, the enhanced pressure variation being detected by the pressure measuring device, a specific position of the chokepoint relative to the pressure measuring device being configured so that the pressure variation produced by a leak is significant and detectable by the pressure measuring device relative to the normal operating pressure,
   a sonic impact appears at the chokepoint so that the leak detector detects the enhanced pressure variation relative to the low normal pressure downstream from said chokepoint, and the sonic impact is dissipated by the time the sonic impact reaches the at least one ejection opening such that there is no sonic impact at the least one ejection opening.

20. The defrosting device according to claim 19, wherein there are a plurality of ejection openings, and the plurality of ejection openings have a total cross section S that corresponds to a sum of cross sections of the ejection openings.

21. The defrosting device according to claim 20, wherein the chokepoint has a cross-section S' that is larger than S, and the cross-section S' is equal to the ejection cross-section S that is increased by a cross-section that corresponds to a margin and to pressure drops that are present in the pipe between said chokepoint and the plurality of ejection openings.

* * * * *